(12) United States Patent
Baykul et al.

(10) Patent No.: US 11,194,007 B2
(45) Date of Patent: Dec. 7, 2021

(54) DEVICE MEASURING OPTIMUM INCLINATION ANGLE FOR SOLAR COLLECTORS

(71) Applicant: ESKISEHIR OSMANGAZI UNIVERSITESI, Eskisehir (TR)

(72) Inventors: Mevlana Celalettin Baykul, Eskisehir (TR); Ismail Sadanoglu, Eskisehir (TR)

(73) Assignee: ESKISEHIR OSMANGAZI UNIVERSITESI, Eskisehir (TR)

( * ) Notice: Subject to any disclaimer, the term of this patent is extended or adjusted under 35 U.S.C. 154(b) by 222 days.

(21) Appl. No.: 16/625,676

(22) PCT Filed: Jun. 13, 2018

(86) PCT No.: PCT/TR2018/050311
§ 371 (c)(1),
(2) Date: Dec. 21, 2019

(87) PCT Pub. No.: WO2019/088950
PCT Pub. Date: May 9, 2019

(65) Prior Publication Data
US 2021/0152120 A1    May 20, 2021

(30) Foreign Application Priority Data
Jun. 22, 2017  (TR) ................................ 2017/09289

(51) Int. Cl.
*G01S 3/78* (2006.01)
*G01S 3/786* (2006.01)
(Continued)

(52) U.S. Cl.
CPC ............ *G01S 3/7861* (2013.01); *G05D 3/105* (2013.01); *H02S 20/32* (2014.12); *G01J 2001/4266* (2013.01); *H02S 40/38* (2014.12)

(58) Field of Classification Search
CPC ........ G01S 3/7861; H02S 20/32; H02S 40/00; G05D 3/105; G01J 2001/4266
See application file for complete search history.

(56) References Cited

U.S. PATENT DOCUMENTS

| | | | |
|---|---|---|---|
| 10,461,682 B2 * | 10/2019 | Schuit | .................... F24S 25/632 |
| 2008/0121273 A1 * | 5/2008 | Plaisted | .................. F16L 3/127 |
| | | | 136/251 |

(Continued)

FOREIGN PATENT DOCUMENTS

| | | |
|---|---|---|
| ES | 2525883 A1 | 12/2014 |
| WO | 2016123592 A1 | 8/2016 |

*Primary Examiner* — Kevin K Pyo
(74) *Attorney, Agent, or Firm* — Bayramoglu Law Offices LLC (57) ABSTRACT

A measurement device which enables to determine the optimum angle values and orientations of collectors/cells and which enables to measure both direct radiation and diffuse radiation, essentially includes a main body; a solar cell which generates current from solar energy; an actuation mechanism which is adapted to move the solar cell in horizontal and vertical axis; an upper cover which prevents the sun beams reaching the solar cell by covering the upper part of the main body; a second cover on each one of the lateral walls of the upper cover; a current detector which measures the current generated by the solar cell, a control unit which includes a processing unit adapted to generate angle signals that will move the first motor and second motor and determine the optimum angle values according to current information corresponding to the angle signals and the angle information corresponding to the current information.

20 Claims, 6 Drawing Sheets

(51) Int. Cl.
*H02S 20/32* (2014.01)
*G05D 3/10* (2006.01)
H02S 40/38 (2014.01)
G01J 1/42 (2006.01)

(56) References Cited

U.S. PATENT DOCUMENTS

2009/0229597 A1    9/2009   Choi et al.
2015/0207005 A1    7/2015   Feng

* cited by examiner

DEVICE MEASURING OPTIMUM INCLINATION ANGLE FOR SOLAR COLLECTORS

CROSS REFERENCE TO THE RELATED APPLICATIONS

This application is the national phase entry of the International Application No. PCT/TR2018/050311, filed on Jun. 13, 2018, which is based upon and claims priority to Turkish Patent Application No. 2017/09289, filed on Jun. 22, 2017, the entire contents of which are incorporated herein by reference.

TECHNICAL FIELD

The present invention relates to a hand-held device which enables to determine optimum inclination angle of solar collectors and solar cells, and also total solar radiation intensity, diffuse radiation intensity and direct radiation intensity separately.

BACKGROUND

Devices such as pyranometer, pyrheliometer, pyrradiometer and solarmeter are used to measure solar radiation intensity. The said devices have large dimensions and data storage cannot be performed by recording during experiments. For this reason, other devices are also required for the necessary statistical analyses.

The solar energy coming on the collectors or the solar cells is comprised of both direct sun beam and diffuse beams. Among the previous techniques mentioned above, pyranometer, can measure diffuse radiation; pyrheliometer can only measure direct radiation; pyrradiometer can measure total or specific radiations (for example infrared radiations); and solarmeter can measure total radiation. There is no technique present that can measure two radiation states together or separately.

In addition, these devices cannot directly provide the optimum angle for direct radiation; the result is only achieved after several calculations are made manually.

SUMMARY

The objective of the present invention is to provide a device which can measure both direct radiation and diffuse radiation with the optimum radiation angle for collectors and solar cells where it is to be used. Furthermore, the said device can perform measurement process simultaneously on the field where the collector or the solar cell is present. In addition, it shows the optimum inclination and orientation to the user by means of a mini LED (Light Emitting Diode) display provided therein.

The inventive device has a data storage system which can record radiation intensity and inclination angle data, and a control unit which can process the said data. By this means, the relation between the radiation intensity and the inclination angle, and the information can be presented to the users as graphic/result on the mini LED display.

The said device can also measure the ambient temperature. Knowing the said temperature value explains to the users of collector or solar cell how much radiation causes how high ambient temperature. This information is essentially important for insulation systems of buildings where collectors and solar cells are used. In addition to this, it will provide great benefits in construction of "Zero Energy" buildings. It will also constitute base for studies that are to be carried out on this subject.

In one embodiment of the invention, the inventive device has the dimensions of 15×15×15 cm3, and it can easily be carried.

BRIEF DESCRIPTION OF THE DRAWINGS

A measurement device developed to fulfill the objectives of the present invention is illustrated in the accompanying figures, in which.

The components shown in the figures are each given reference numbers as follows:
1. Measurement device
2. Main body
3. Solar cell
4. Actuation mechanism
　4.1. First motor
　4.2. First shaft
　4.3. Plate
　4.4. Second motor
　4.5. Second shaft
　4.6. Connection bar
　4.7. Support bar
　4.8. Bearing
5. Upper cover
6. Second cover
7. Fixing mechanism
　7.1. Fixed part
　7.2. Moveable part
　7.3. Hinge
8. Keypad
9. Control unit
10. Memory unit
11. Display
12. Water level

DETAILED DESCRIPTION OF EMBODIMENTS

A measurement device (1), which enables to determine the optimum angle values and orientations at which the solar collectors/cells can generate maximum current and which enables to measure both direct radiation and diffuse radiation, essentially comprises
a main body (2),
a solar cell (3) which generates current from solar energy,
an actuation mechanism (4) which is adapted to move the solar cell (3) in horizontal and vertical axis and comprises
a first motor (4.1) which is vertically connected to the base of the main body (2),
a first shaft (4.2) which is connected to one end of the first motor (4.1),
a plate (4.3) which is connected to other end of the first shaft (4.2) and which has preferably a circular shape,
a second motor (4.4) which is horizontally connected on the plate (4.3), a second shaft (4.5) one end of which is connected to the second motor (4.4) and on body of which a solar cell (3) is connected an upper cover (5) which has side walls and upper wall preventing the sun beams reaching the solar cell (3) by covering the upper part of the main body (2), a second cover (6) on each one of the side walls and preferably on the upper wall of the upper cover (5), a control unit (9) which comprises a current detector measuring the current generated by the solar cell (3), and comprises a processing unit adapted to generate angle signals that will move the first motor (4.1) and second motor (4.4) and determine the optimum angle value providing the maximum current information according to current information incoming in response to the said angle signals, a memory unit (10) which enables to record current information measured by the control unit (9) and the angle information corresponding to the said current information, a display (11) which is provided on the main body, and enables the angle information determined by the control unit (9) to be transferred to the user.

Figure 1:
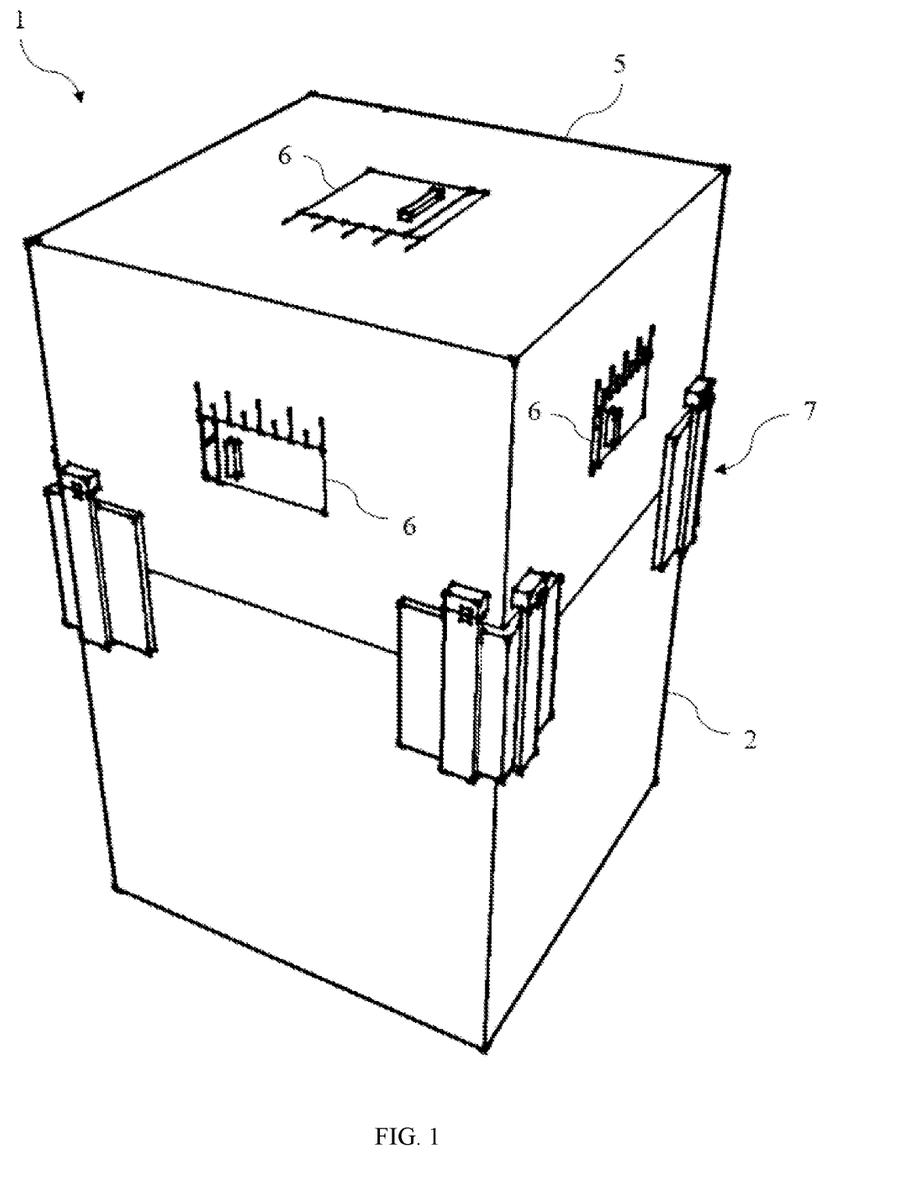
FIG. 1 shows a perspective view of the measurement device.
Figure 2:
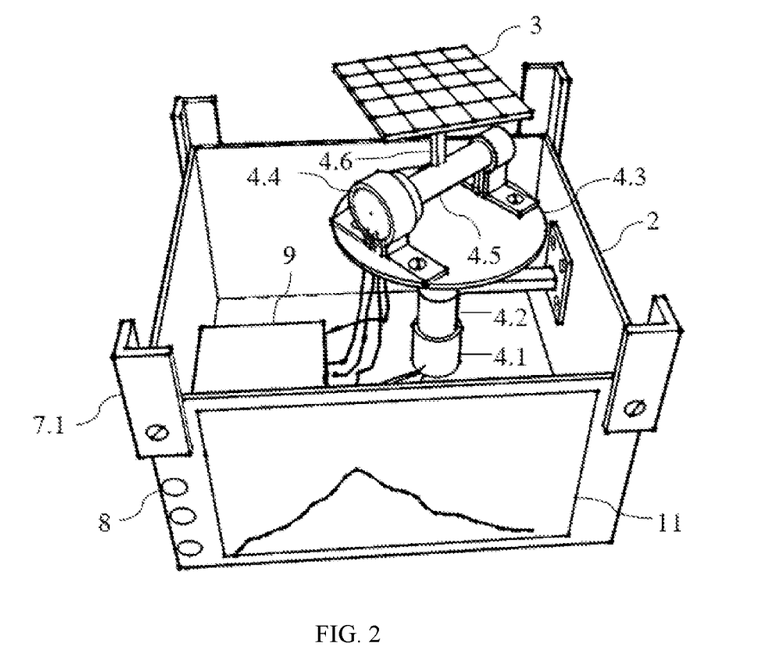
FIG. 2 shows another perspective view of the measurement device.

In FIGS. 1 and 2, a perspective view of the inventive measurement device (1) is shown. The components and operating principle of the said measurement device (1) are described in detail below.

In a preferred embodiment of the invention, the main body (2) has a square or rectangle form comprised of a lower wall, four side walls and an upper wall. In alternative embodiment of the invention, the main body (2) may also have different geometries (for example a cylindrical geometry).

Figure 3:
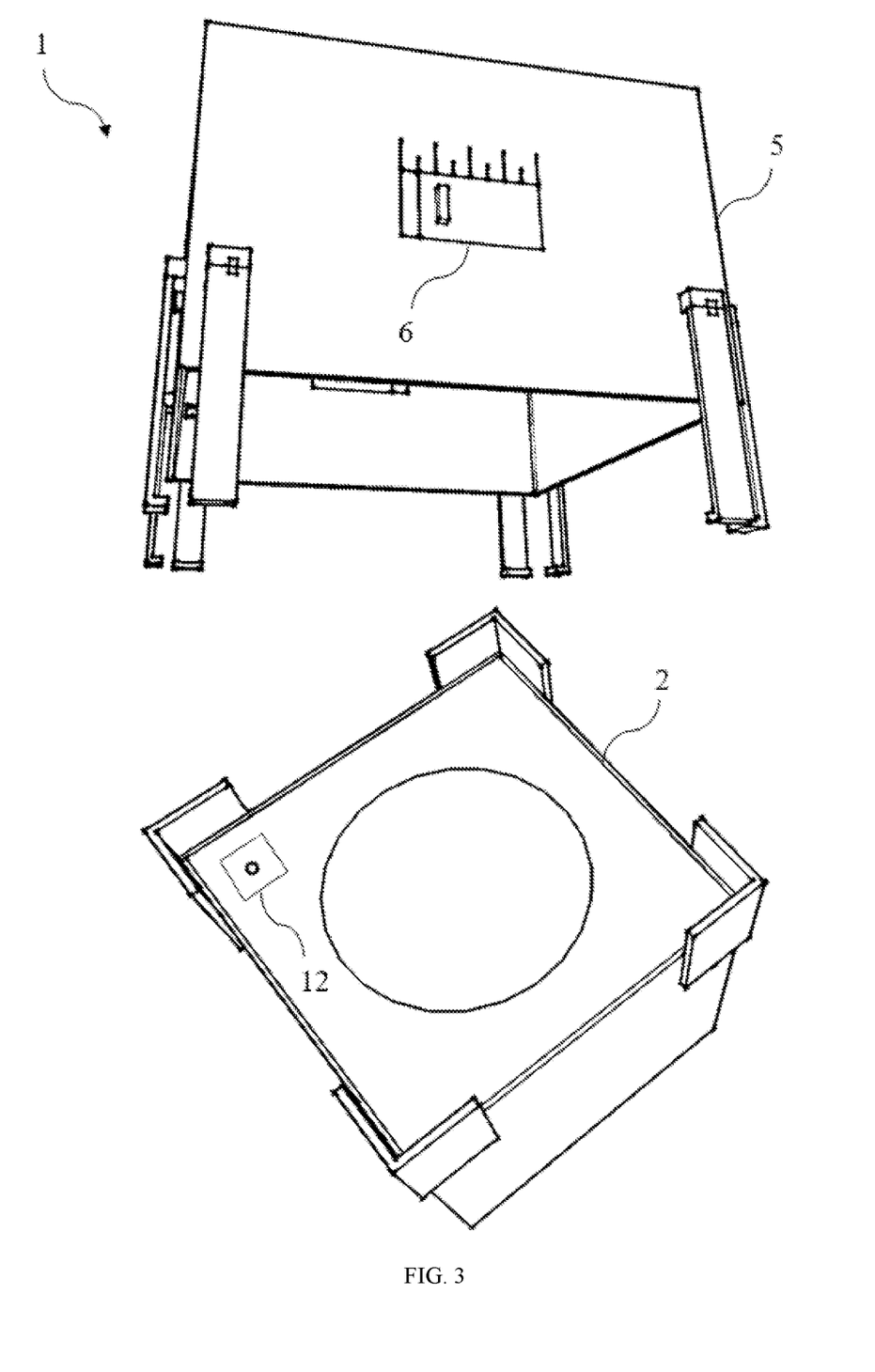
FIG. 3 shows another perspective view of the measurement device.

There is a circular cavity and a water level (12) on the said upper wall (FIG. 3). The said water level (12) is used to determine whether the main body (2) is exactly parallel to the surface to be measured.

Figure 4:
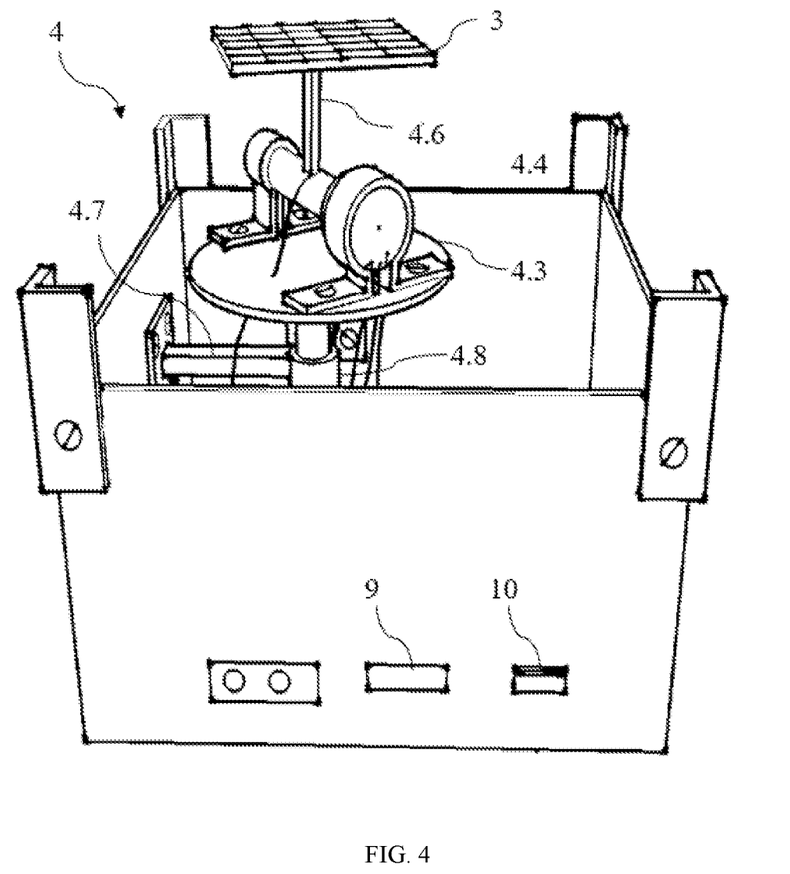
FIG. 4 shows a perspective view of a main body and actuation mechanism.

The first motor (4.1) (preferably a servo motor) which is one of the components of the actuation mechanism (4) provided inside the main body (2) is the motor which enables the rotary movement of the solar cell (3) on the vertical axis, in other words the right-left rotary movement on a z axis (FIG. 2-4). The said first motor (4.1) has a first end and a second end. The said first end is connected to the end of the main body (2), and there is provided a first shaft (4.2) at its second end (outlet) which extends vertically to the upper wall of the main body (2). The first shaft (4.2) has a first end and a second end, and its first end is connected to the first motor (4.1) while its second end is connected to a plate (4.3). A second motor (4.4) (preferably a servo motor) is horizontally connected on the plate (4.3), there is a second shaft (4.5) extending parallel to the plate (4.3) at one end (outlet) of the said second motor (4.4). The second shaft (4.5) has a first end, a second end and a body, and its first end is connected to the said motor (4.4) while a solar cell (3) is connected on its body by means of a connection bar (4.6). The said connection bar (4.6) can be connected to the base or a lower edge of the solar cell (3). Depending on the said connection forms, the solar cell (3) can be positioned vertical or parallel to the base of the main body (2). Both ends of the second shaft (4.5) are connected to the plate (4.3) by means of a connection piece (preferably a connection bracket or a bearing in omega form). When rotation signal is transferred to the first motor (4.1) by the control unit (9), the first motor (4.1) drives the first shaft (4.2) connected to its outlet, and thus the plate (4.3) connected to one end of the first shaft (4.2) moves in clockwise or counter clockwise direction in vertical axis. Therefore, the solar cell (3) connected to the said plate (4.3) through the second motor (4.4) and the second shaft (4.5) is also moved in the vertical axis.

The said second motor (4.4) enables the rotary movement of the solar cell (3) in horizontal axis (y axis). When the rotation signal is transferred to the second motor (4.4) by the control unit (9), the second motor (4.4) drives the second shaft (4.5) connected to its outlet, and thus the solar cell (3) connected to the body of the second shaft (4.5) is also rotated around the axis of the second shaft (4.5).

Furthermore, in the actuation mechanism (4), there are at least one support bar (4.7) connected to at least one internal side wall of the main body (2), and a bearing (4.8) connected to one end of the said support bar (4.7). The said bearing (4.8) has a circular geometry, and the first shaft (4.2) passes through the opening on the inner part of the said bearing (4.8). Therefore, the first shaft (4.2) is prevented from oscillating during rotation.

The upper part of the main body (2), in other words the part where the solar cell (3) is present, can be covered with an upper cover (5). The said upper cover (5) is comprised of four side walls and an upper wall. The said upper wall and the side walls are connected to each other as single piece. In an alternative embodiment of the invention, the said walls are separate from each other, and they can be connected to each other with a connection member (bolt, hinge, etc.).

There is one opening on each one of the upper and side walls of the upper cover (5). These openings are covered by means of each one of the second covers (6). In one embodiment of the invention, the said second covers (6) are designed as sliding covers moving into the channels/grooves present on the inner or outer surfaces of the walls of the upper cover (5), and there is one handle on each one of the second covers (6) so that they can easily be closed and opened. In an alternative embodiment of the invention, the said second covers (6) are connected to the said walls with a hinge. As it is explained below, the second covers (6) are opened and closed when diffuse measurement will be performed, and thus the sun light is enabled to reach the solar cell (3) inside the upper cover (5) in a controlled way.

Figure 5:
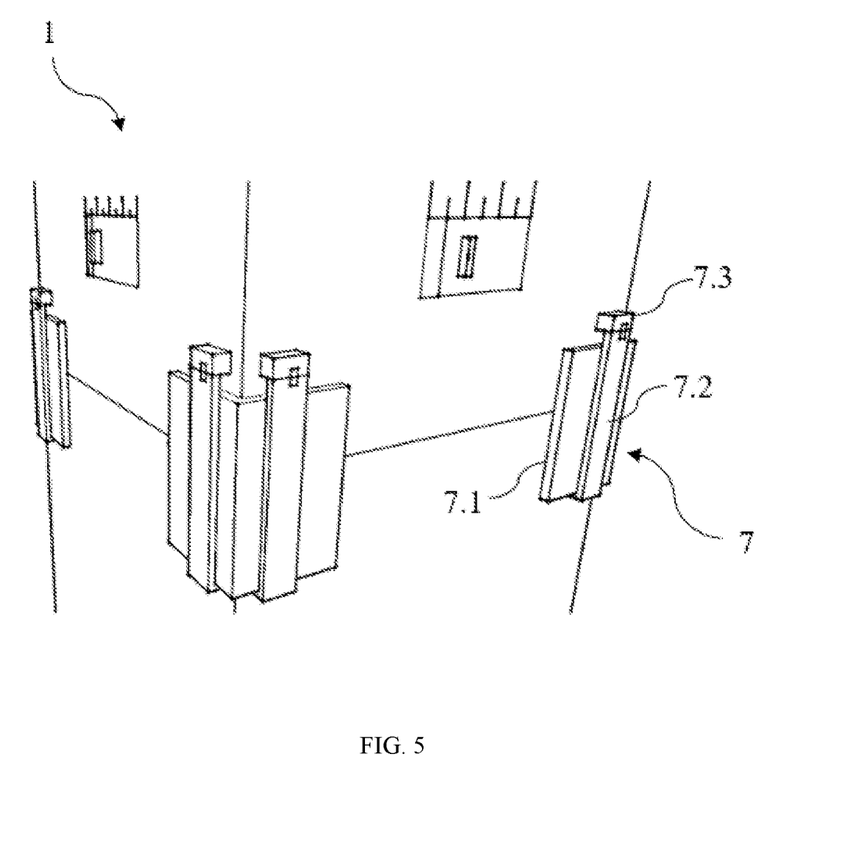
FIG. 5 shows a perspective view of a fixing mechanism.
Figure 6:
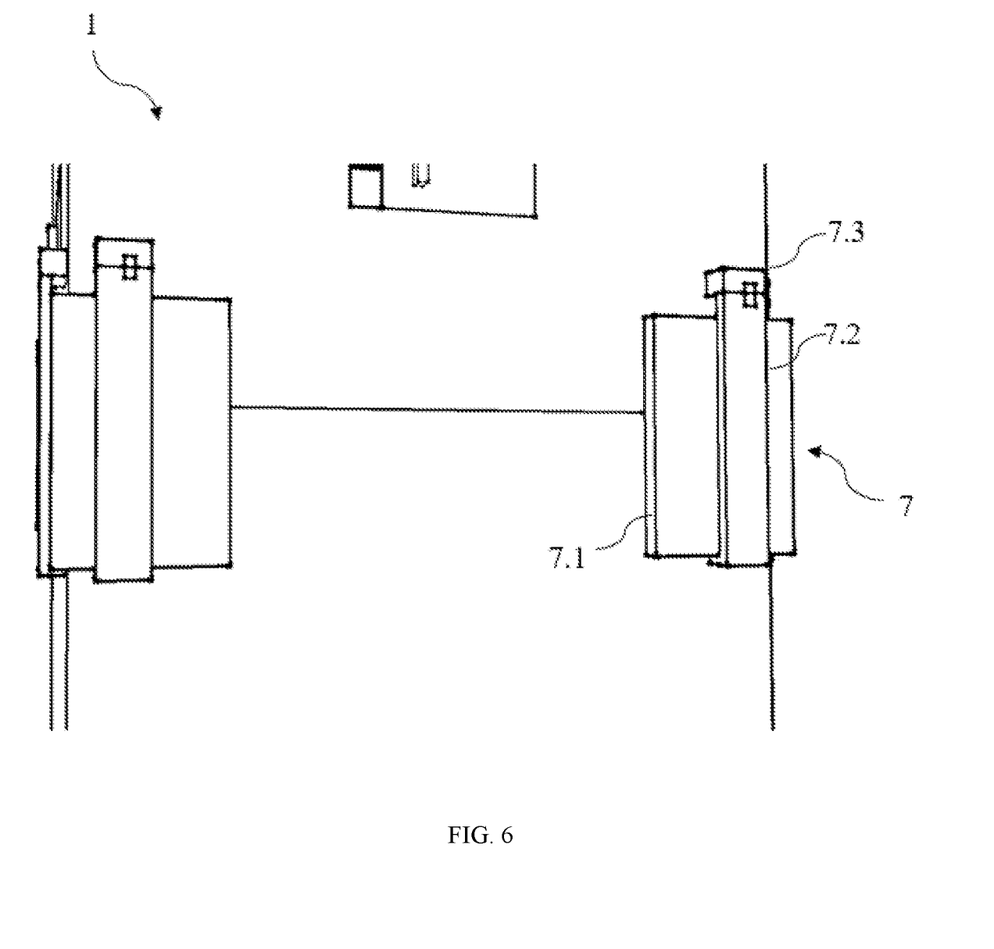
FIG. 6 shows a front view of a fixing mechanism.

In one embodiment of the invention, a fixing mechanism (7) is used for fixing main body (2) to the upper cover (5). In the said mechanism, there are two fixed parts (7.1) on the edges of the main body (2), which are preferably fixed with a screw or adhesive and comprised of a single piece structure connected vertically to each other. In an alternative embodiment of the invention (not shown in the figures), the said two fixed parts (7.1) provided in the abovementioned fixing mechanism (7) are designed separately from each other, and they are fixed close to each one of the edges of the main body (2) separately.

Another component of the fixing mechanism (7) is the movable part (7.2) provided on the upper cover (5). The said movable part (7.2) has one first end, a second end, and a body.

The first end of the said movable part (7.2) is connected to the upper cover (5) by means of a hinge (7.3), and there is a protrusion extending vertically to the body of the movable part (7.2). When the upper cover (5) is fitted on the main body (2), the movable parts (7.2) is brought to parallel position to the side walls of the main body (2) and the upper cover (5) by means of the hinges (7.3). In this case, at one end of the movable part (7.2) the upper surface of the protrusion contacts the lower surface of the fixed part (7.1) on the main body (2). Therefore, the horizontal and vertical movement of the upper cover (5) is prevented by fixing to the main body (2).

In an alternative embodiment of the invention (not shown in the figures), there are grooves (channels) on the outer or inner surface of the main body (2), close to the edges, and the upper cover (5) can be moved up and down in the said channel. In order to preserve the solar cell (3) apart from the measurement and use for diffuse radiation measurement, the upper cover (5) is moved upwards in the grooves and thus the solar cell (3) is closed, and smaller second covers (6) provided on the said upper cover (5) enable to measure the diffuse radiation by being used to receive the radiation inside in a controlled way. There holes on the said upper cover (5) and the grooves, and the upper cover (5) is enabled to be fixed where it is located by means of a pin to be passed through the holes.

The control unit (9) provided inside the main body (2) may comprise processing unit such as a microprocessor, a microcontroller, etc., and a current detecting circuit or a current sensor (for example Hall Effect Field sensor) connected to the said processing unit and the solar cell (3) by means of a conductive cable. In one embodiment of the invention, the said control unit (9) comprises a chip adapted to measure the current generated by the solar cell (3) and sending signal to the motors.

In one embodiment of the invention, a temperature sensor (for example a thermocouple) is connected to the said control unit (9), and the ambient temperature can be measured by means of the said temperature sensor.

In one embodiment of the invention, there is a wireless data communication module (for example GPRS module (General Packet Radio Service), GSM (Global System for Mobile Communications) module, Wi-Fi (Wireless Fidelity) module, Bluetooth module, 3G/4G/4.5G module . . . ) connected to the control unit (9) inside the main body (2), and the data processed by the control unit (9) can be transferred to a user terminal (for example a computer, mobile phone, tablet computer) or a server through the said wireless data communication module. Therefore, remote access to the said data can be provided.

In one embodiment of the invention, there is a data communication interface (for example a USB (Universal Serial Bus) interface) connected to the control unit (9) on the main body (2), and the current, optimum angle and radiation intensities measured/calculated by the control unit (9) can be transferred to an electronic device such as a computer, phone, etc. through a cable by means of the said interface.

In one embodiment of the invention, the display (11) connected to the control unit (9) is a touchscreen, and the operations requested by the user can be carried through the said display (11). For example, operations such as radiation measurement, current measurement, turning on and off the measurement device (1), transferring data wirelessly, etc. can be selected through the said display (11). In another embodiment of the invention, there is a display (11) and a keypad (8) on the main body (2) and the said operations can be selected via the said keypad (8), and the selected operations and the graphics generated by the control unit (9) can be shown via the display (11).

The energy required for the operation of the measurement device (1) is supplied by a battery. The said battery can be charged via the solar cell (3) by means of a charging circuit or it can be externally charged by being removed from the measurement device (1). In one embodiment of the invention, the energy required for the operation of the measurement device (1) is supplied by means of an adapter. For this, there is an adapter inlet or USB charging inlet on the main body (2), and thus the measurement device (1) can be operated and the battery therein can be charged by means of the electric energy supplied via the said adapter or the USB inlet.

In this invention, the solar cell (3) is used as a sensor. The solar cells (3) create current and potential different while converting the solar energy into electric energy. The intensity of the sun beam increases, the current generated by the solar cells (3) also increases proportionally, and therefore solar radiation intensity is associated with the current by the control unit (9). Furthermore, when the solar cell (3) is not used for measurement, it is also used for filling the rechargeable batteries supplying energy required for the operation of first motor (4.1), second motor (4.4), control unit (9) and the display (11).

In one embodiment of the invention, the measurement device (1) can also enable the current value to give the solar radiation intensity. In order to determine solar radiation intensity from the current, at the start the measurement device (1) is calibrated with a pyranometer for once. For this, current/radiation relation information is determined, and the measured current information is compared to the said information, the radiation intensity information corresponding to measured current information can be calculated. For example, current values obtained with the solar cell (3) and the radiation intensities measured with pyranometer are recorded simultaneously and associated with each other (for example a current/radiation intensity graphic is created, and the curve of this graphic is utilized), an equation is obtained which will give radiation intensity measured with pyranometer of the current values generated by the solar cell (3), and the said control unit (9) can be programmed to carry out the said equation.

Optimum inclination angle of solar collectors/cells is determined as follows by using the measurement device (1):

The measurement device (1) is held parallel to the front face of the building as a reference at the place of measurement. In order to determine whether this parallelism is provided, the water level (12) on the upper wall of the main body (2) can be utilized. In this case, preferably, the solar cell (3) is perpendicular to the bottom of the main body (2) and parallel to the front wall of the building to be referenced. Then, when the measurement device (1) is operated using the touch display (11) or the keypad (8), first rotation (angle) signals are transmitted by the control unit (99 to the first motor (4.1). For example, rotation signals are transferred to the said first motor (4.1) by the control unit (9) so that the first motor (4.1) preferably rotates with 1° angle each time. Alternatively, signals to rotate the first motor (4.1) at a predetermined angle (for example an angle between 0.1 to 1°) can be sent by the control unit (9).

In accordance with the said incoming signals, the solar cell (3) is started to rotate with one degree angles between 0-180° (but there is no necessity to rotate completely between the angles of 0-180°) around vertical axis (z axis) by means of the first motor (4.1). While rotation is realizing, current values generated by the solar cell (3) are measured by the control unit (9) simultaneously, and the said current values are matched with the angle values corresponding to these current values, and recorded in the memory unit (10). In other words, when the first motor (4.1) is rotated by transferring a 1° rotation signal to the first motor (4.1) by the control unit (9), the current generated by the solar cell (3) is measured by the solar cell (3), and the said measured current value is matched with the 1° angle value. The processes of transferring the said rotation signals and measuring the current after each one of the rotation signals are repeated until the first motor (4.1) is rotated 180° (alternatively the said repetition can also be terminated in case the current value measured by the control unit (9) decreases). There is an increase from minimum current value (minimum solar radiation value) to the maximum, and then there is a decrease from maximum to minimum. Then the angle corresponding to the maximum current value among the measured current values is determined by the control unit (9). The said angle value corresponds to the orientation of solar cell (3) in XY plane, and the said angle value is recorded in the memory unit (10) by the control unit (9).

Then again a rotation (angle) signal is sent to the first motor (4.1) by the control unit (9). In accordance with this signal, the solar cell (3) is brought back to the angle corresponding to the maximum current value by means of the first motor (4.1).

In next step, this time rotation signals are sent to the second motor (4.4) by the control unit (9). In other words, rotation signals are transferred to the said second motor (4.4) by the control unit (9) so that the second motor (4.4) rotates with 1° angle each time. Alternatively, signals to rotate the second motor (4.4) at a predetermined angle (for example an angle between 0.1 to 1°) can be sent by the control unit (9).

In accordance with these signals, the solar cell (3) is rotated around horizontal axis (y axis) with preferably one degree angles between 0-90 degrees by the second motor (4.4). While rotation is realizing, current values generated by the solar cell (3) are measured by the control unit (9) simultaneously, and the said current values are matched with the angle values corresponding to these current values, and recorded in the memory unit (10). In other words, when the second motor (4.4) is rotated by transferring a 1° rotation signal to the second motor (4.4) by the control unit (9), the current generated by the solar cell (3) is measured by the solar cell (3), and the said measured current value is matched with the 1° angle value. The processes of transferring the said rotation signals and measuring the current after each one of the rotation signals are repeated until the second motor (4.4) is rotated 90° (alternatively the said repetition can also be terminated in case the current value measured by the control unit (9) decreases). In this case, the current values change from minimum to maximum and then again from maximum to minimum and the angle corresponding to the maximum current value among the measured current values is determined by the control unit (9). Therefore, the angle corresponding to the maximum current value is also determined. The said angles corresponding to the maximum current value for vertical and horizontal axis are the optimum inclination and orientation angles of the solar collector.

As a result, in order to obtain maximum performance from the solar collectors, the angle value which enables the radiation to come to the collector surface with right angle for the longest time during the day can be determined, so that the best angles of orientation for solar collectors and solar panels on the building roofs can be determined.

In one embodiment of the invention, the said angle values can be digitally shown on the display (11) by the control unit (9). In another embodiment of the invention, the said angle values and the current values corresponding to the said angle values can be shown on the display (11) as an angle/current graphic. In another embodiment of the invention, the said angle values and the total radiation intensity corresponding to the said angle values can be shown on the display (11) as an angle/radiation intensity graphic. The displaying ways mentioned in these embodiments can be selected by using touch display (11) or keypad (8) and can be displayed through a graphical interface on the display (11).

Total solar radiation intensity (IT) and diffuse radiation intensity (IY) can be measured with the measurement device (1). Then, considering the said measurement results by the control unit (9), direct radiation intensity (ID) can be calculated (ID=IT−IY).

In order to measure the total solar radiation intensity (IT=ID+IY), the upper cover (5) is completely removed from top of the main body (2), and sun beams comprised of diffuse radiation (IY) and direct radiation (ID) are enabled to directly reach the solar cell (3). In accordance with the said total solar radiations coming on the solar cell (3), it generates a current and the control unit (9) calculates the total radiation intensity (IT) corresponding to the said current value and records in the memory unit (10).

For measuring diffuse radiation intensity (IY), second covers (6) provided on the side walls of the upper cover (5) are opened in a controlled way, and the second cover (6) provided on the upper Wall of the upper cover (5) is kept closed. Therefore, direct radiations directly reaching the solar cell (3) are prevented, only diffuse radiations are enabled to reach the solar cell (3). In accordance with the said diffuse solar radiations coming on the solar cell (3) from the second covers (6) provided on the side walls of the upper cover (5), the solar cell (3) generates a current, and the control unit (9) calculates the diffuse radiation intensity (IY) corresponding to the said current value and records it in the memory unit (10). In one embodiment of the invention, for measuring diffuse radiation intensity (IY), besides the second covers (6) provided on the side walls of the upper cover (5), the second cover (6) provided on the upper Wall of the upper cover (5) can be opened in a controlled way depending on the situation (for example in case the solar beams are in a position that they will not enter rom the said second cover (6) directly, so that the diffuse radiation comprised of solar beams hitting and reflecting from molecules and a surface in the environment reach the solar cell (3)).

After the total radiation intensity (IT) and the diffuse radiation intensity (IY) are measured, finally direct radiation intensity (ID) is calculated. For this purpose, the direct radiation (ID) can be calculated (ID=IT−IY) by taking the difference of the total solar radiation (IT) and the diffuse radiation (IY) by the control unit (9).

As a result, total solar radiation intensity (IT), diffuse radiation intensity (IY) and direct radiation intensity (ID) are determined separately.

In one embodiment of the invention, total radiation intensity (IT), diffuse radiation intensity (IY) and direct radiation intensity (ID) can be digitally shown on the display (11) by the control unit (9). The displaying ways mentioned in these embodiments can be selected by using touch display (11) or keypad (8) and can be displayed through a graphical interface on the display (11).

The invention claimed is:

1. A device of determining optimum angle values and orientations wherein at the optimum angle values and orientations, a plurality of solar collectors/cells generate a maximum current and enables to measure both a direct radiation and a diffuse radiation, essentially comprising
    a main body,
    a solar cell generates a current from a solar energy, and
    an actuation mechanism wherein the actuation mechanism is adapted to move the solar cell in a horizontal and vertical axis and the actuation mechanism comprises
        a first motor wherein the first motor is vertically connected to a base of the main body,
        a first shaft wherein the first shaft is connected to one end of the first motor,
        a plate wherein the plate is connected to an other end of the first shaft,
        a second motor the second motor is horizontally connected on the plate, a second shaft one end of the second shaft is connected to the second motor and on body of a solar cell is connected, an upper cover wherein the upper cover has a plurality of lateral walls and the upper wall preventing the sun beams reaching the solar cell by covering the upper part of the main body, a second cover on each one of the plurality of lateral walls of the upper cover, a control unit wherein the control unit comprises a current detector measuring the current generated by the solar cell, and comprises a processing unit adapted to generate a plurality of angle signals wherein the plurality of angle signals will move the first motor and second motor and determine the optimum angle values providing the maximum current information according to current information incoming in response to the plurality of angle signals, a memory unit enables to record current information measured by the control unit and the angle information corresponding to the current information, a display is provided on the main body, and enables the angle information determined by the control unit to be transferred to a user.

2. The device according to claim 1, wherein a water level is provided on the upper wall of the main body.

3. The device according to claim 1, wherein a plurality of second covers are designed as sliding covers moving inside a plurality of channels provided on a plurality of inner or outer surfaces of the upper cover.

4. The device according to claim 1, wherein a fixing mechanism enables the main body and the upper cover to be fixed to each other and comprises
   a plurality of fixed parts fixed on a plurality of edges of the main body,
   a plurality of movable parts having a first end fixed to the upper cover with a hinge, a body, and a second end extending vertical to the body.

5. The device according to claim 1, wherein a temperature sensor enables to detect an ambient temperature and is connected to the control unit.

6. The device according to claim 1, wherein a wireless data communication module enables to transfer data wirelessly to a user terminal or to a server, and is connected to the control unit.

7. The device according to claim 1, wherein a data communication interface enables cabled data communication with an electronic device.

8. The device according to claim 1, wherein the display is a touch screen.

9. The device according to claim 1, wherein a keypad is provided on the main body.

10. The device according to claim 1, wherein a battery supplies an energy required for an operation of the device.

11. The device according to claim 1, wherein a charge circuit enables to charge a battery through the solar cell.

12. The device according to claim 1, wherein the control unit is adapted to calculate radiation intensity according to the current information.

13. The device according to claim 1, wherein the control unit is adapted to show a plurality of angle values and current values corresponding to the plurality of angle values on the display as an angle/current graphic.

14. The device according to claim 1, wherein the control unit is adapted to show a plurality of angle values and total radiation intensities corresponding to the plurality of angle values on the display as an angle/radiation intensity graphic.

15. A method of determining optimum angle values of solar collectors/cells, carried out by the device according to claim 1, comprising the steps of
   transferring a plurality of rotation signals to the first motor by the control unit,
   rotating the solar cell around the vertical axis between the plurality of angles of 0-180° in accordance with the plurality of signals,
   measuring a plurality of current values generated by the solar cell during rotation by the control unit, and matching the plurality of current values with the plurality of corresponding angle values and recording the plurality of current values and the plurality of corresponding angle values in the memory unit,
   determining a maximum current value and an angle value corresponding to a value by the control unit,
   sending a rotation signal again to the first motor by the control unit, and bringing the solar cell to the angle corresponding to the maximum current value by means of the first motor,
   transferring the plurality of rotation signals to the second motor by the control unit,
   rotating the solar cell around the horizontal axis between 0-90 degrees by the second motor in accordance with a signal,
   measuring the plurality of current values generated by the solar cell during rotation by the control unit, and matching the plurality of current values with the plurality of corresponding angle values and recording the plurality of current values and the plurality of corresponding angle values in the memory unit,
   determining the maximum current value and the angle value corresponding to the value by the control unit,
   showing the plurality of angles corresponding to the maximum current value by the control unit on the display.

16. The method according to claim 15, wherein a water level is provided on the upper wall of the main body.

17. The method according to claim 15, wherein a plurality of second covers are designed as sliding covers moving inside a plurality of channels provided on a plurality of inner or outer surfaces of the upper cover.

18. The method according to claim 15, wherein a fixing mechanism enables the main body and the upper cover to be fixed to each other and comprises
   a plurality of fixed parts fixed on a plurality of edges of the main body,
   a plurality of movable parts having a first end fixed to the upper cover with a hinge, a body, and a second end extending vertical to the body.

19. The method according to claim 15, wherein a temperature sensor enables to detect an ambient temperature and is connected to the control unit.

20. The method according to claim 15, wherein a wireless data communication module transfers data wirelessly to a user terminal or to a server, and wherein wireless data communication module is connected to the control unit.

* * * * *